US010922888B2

(12) United States Patent
Cherukuri

(10) Patent No.: US 10,922,888 B2
(45) Date of Patent: Feb. 16, 2021

(54) SENSOR FUSION AUGMENTED REALITY EYEWEAR DEVICE

(71) Applicant: Nick Cherukuri, Princeton, NJ (US)

(72) Inventor: Nick Cherukuri, Princeton, NJ (US)

(*) Notice: Subject to any disclaimer, the term of this patent is extended or adjusted under 35 U.S.C. 154(b) by 0 days.

(21) Appl. No.: 16/199,220

(22) Filed: Nov. 25, 2018

(65) Prior Publication Data
US 2020/0168000 A1 May 28, 2020

(51) Int. Cl.
G06F 3/03 (2006.01)
G06T 19/00 (2011.01)
H04N 13/279 (2018.01)
H04N 13/122 (2018.01)
H04N 13/204 (2018.01)
G06F 3/01 (2006.01)
G02B 27/01 (2006.01)
H04N 13/00 (2018.01)

(52) U.S. Cl.
CPC ........ G06T 19/006 (2013.01); G02B 27/0172 (2013.01); G06F 3/012 (2013.01); G06F 3/0325 (2013.01); H04N 13/122 (2018.05); H04N 13/204 (2018.05); H04N 13/279 (2018.05); G02B 2027/0134 (2013.01); G02B 2027/0138 (2013.01); G02B 2027/0178 (2013.01); H04N 2013/0096 (2013.01)

(58) Field of Classification Search
None
See application file for complete search history.

(56) References Cited

U.S. PATENT DOCUMENTS

| 8,213,634 B1* | 7/2012 | Daniel | H04R 3/005 381/122 |
| 2012/0105473 A1* | 5/2012 | Bar-Zeev | G02B 27/017 345/633 |
| 2013/0109371 A1* | 5/2013 | Brogan | G06F 1/1626 455/420 |
| 2016/0379414 A1* | 12/2016 | Brown | G06F 3/04842 345/633 |
| 2017/0262045 A1* | 9/2017 | Rouvinez | G06T 19/006 |

* cited by examiner

Primary Examiner — Said Broome

(57) ABSTRACT

An augmented reality eyewear device to operate augmented reality applications and provides a wide-angle field view, is disclosed. The eyewear device comprises a frame which is associated with a processor, a sensor assembly, a camera assembly, and a user interface control assembly coupled to the processor. The sensor assembly coupled to the processor comprises at least two inertial measurement unit (IMU) sensor to transmit raw IMU data of at least one IMU sensor and an android connected IMU data of at least one IMU sensor. The camera assembly coupled to the processor comprises at least two wide angle cameras synchronized with one another is configured to transmit camera feed data from the camera assembly to the processor. The processor is configured to dually synchronize raw IMU Data and android connected IMU data with the camera feed data providing a seamless display of 3D content of the augmented reality applications.

12 Claims, 4 Drawing Sheets

SENSOR FUSION AUGMENTED REALITY EYEWEAR DEVICE

BACKGROUND OF THE INVENTION

A. Technical Field

The present invention generally relates to augmented reality, and more specifically relates to a sensor fusion augmented reality eyewear device with a wide field of view.

B. Description of Related Art

Interactive viewing systems have found application in manufacturing automation and maintenance, surgical procedures, educational instruction, mechanical, architectural, and interior designs, multimedia presentations, and motion picture production. Such interactive viewing systems works by displaying computer-generated overlay images, such as a rendering of annotations, blueprints, component parts, buildings, backgrounds, and other images, in a user's field-of-view of a real-world environment to provide information about the real-world objects.

One type of interactive viewing system is referred to as an augmented reality (AR) system. Some augmented-reality approaches rely upon a head-mounted display. These head-mounted displays often have the form-factor of a pair of glasses. Such displays place artificial images over a portion the user's view of the world. Such head-mounted displays are typically either optical see-through mechanisms or video-based mechanisms. Some conventional approaches attempt to use augmented reality to provide user interface. For example, a virtual display may appear on a table surface to provide an alphanumeric-input mechanism in an application setting where no such user-input mechanism otherwise exists or an on/off switch may appear on a wall to permit having the user switch some aspect of the physical world or the augmentation to be switched on and off via manipulation of that switch. Few existing head-mounted augmented reality devices are discussed as follows.

US20170285345 entitled "augmented reality in a field of view including a reflection" discloses a system comprising eyeglasses including a transparent display screen that is coupled with an image capture device on a user, and a reality augmenter to automatically generate an augmented reality object based on an identification of an object in a field of view of the user that is to include a reflection of the user from a reflective surface, wherein the augmented reality object is to be observable by the user on the transparent display screen when the user wears the eyeglasses. Real objects in a field of view of the user are augmented by the AR object using SLAM (Simultaneous Localization and Mapping) process. The device further comprises wireless communication interface.

U.S. Pat. No. 9,240,074 B2 entitled "network-based real time registered augmented reality for mobile devices" discloses a method of operating a mobile device with a camera, a display and a position sensor to provide a display of supplementary information aligned with a view of a scene. One or more image obtained from the camera is uploaded to a remote server together with corresponding data from the position sensor. Image processing is then performed to track image motion between that image and subsequent images obtained from the camera, determining a mapping between the uploaded image and a current image. Data is then received via the network indicative of a pixel location for display of supplementary information within the reference image. The mapping is used to determine a corresponding pixel location for display of the supplementary information within the current image, and the supplementary information is displayed on the display correctly aligned with the view of the scene. Further, SLAM techniques are used for the local tracking.

Though the discussed prior art references are useful to some extent for some purposes, these prior efforts sometimes yield a poor user experience. Therefore, there is a need for a sensor fusion augmented reality eyewear device with a wide field of view to provide better user experience.

SUMMARY OF THE INVENTION

The present invention generally discloses a wearable device. Further, the present invention discloses a sensor fusion augmented reality eyewear device to operate augmented reality applications.

According to the present invention, the augmented reality eyewear device is configured to be worn by a user to operate augmented reality applications. In one embodiment, the eyewear device comprises a frame. In one embodiment, the frame is associated with a processor, a sensor assembly, a camera assembly, and a user interface control assembly. In one embodiment, the processor is in communication with the sensor assembly, the camera assembly, and the user interface control assembly for transferring and receiving signals/data. In one embodiment, the processor could be, but not limited to, an android based snapdragon processor. In one embodiment the processor comprises an android based operating system. In one embodiment, a fan assembly in communication with the processor is configured to increase or decrease the fan speed based on the processor's heat. In one embodiment, the device further comprises a light assembly in communication with the processor.

In one embodiment, the frame supports a pair of glasses lens/optical display in communication with the processor and a camera PCB board. The frame is further integrated with a wireless transceiver which is coupled to the processor. In one embodiment, the sensor assembly comprises at least two inertial measurement unit (IMU) sensors. In one embodiment, at least one IMU is a raw IMU and at least one IMU is an android connected IMU. In one embodiment, the processor could receive the sensor data in a dual combined manner. In one embodiment, the at least two IMU sensors are configured to rotate to match with an axis of at least two wide angle cameras. In one embodiment, the sensor assembly further comprises a light sensor coupled to the processor. The light sensor is configured to input environmental conditions to the processor for providing a display characteristic based on the environmental conditions. In one embodiment, the sensor assembly further comprises, but not limited to, a thermal sensor, a flashlight sensor, 3-axis accelerometer, 3-axis compass, 3-axis gyroscope, and a magnetometer sensor.

In one embodiment, the camera assembly comprises at least two wide angle cameras. The two wide angle cameras are synchronized with one another to transmit camera feed data from the camera assembly to the processor. In one embodiment, the camera feed data from the two wide angle cameras are combined into a single data before processing by the processor via an I2C electrical connection. The placement and angle of the camera assembly could be customizable for simultaneous localization and mapping of an environment. The processor is configured to dually synchronize raw IMU Data and android connected IMU data with the camera feed data providing a seamless display of 3D content of the augmented reality applications In one embodiment, the user interface control assembly comprises an audio command control, a head motion control and a wireless bluetooth control. The user interface enables the user to control the eyewear device.

In one embodiment, the eyewear device further comprises a speaker system to deliver audio data to the user via a wireless communication unit, but not limited to, a Bluetooth®. In one embodiment, the speaker system comprises a built-in Bluetooth to deliver and receive the audio data wirelessly. The eyewear device further comprises a thermal camera, an integrated slam or SLAM (Simultaneous Localization and Mapping) system, a visual odometry tracking, environment meshing, a dominant plane detection and a dynamic occlusion. In one embodiment, the thermal camera could be coupled to the camera PCB board. In one embodiment, the eyewear device further comprises a connector port assembly having a mini-jack port and a Universal Serial Bus Type-C (USB-C) port. The eyewear device is further adapted to use in both outdoor and indoor.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
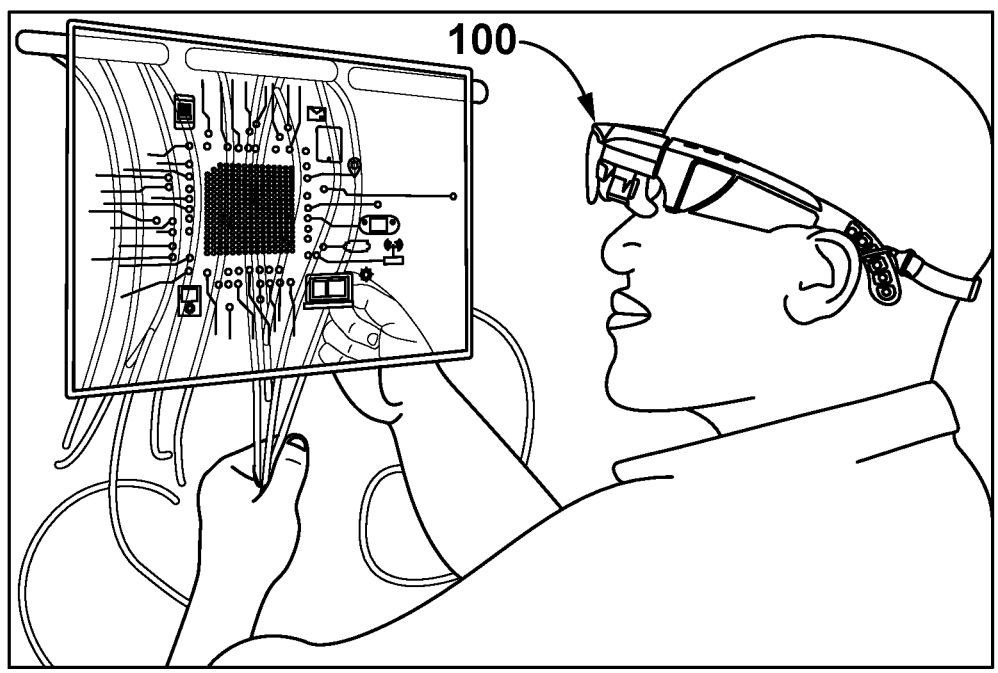
FIG. 1 exemplarily illustrates a user viewing a virtual image through the display of a sensor fusion eyewear device in an embodiment of the present invention.

The present invention discloses a sensor fusion augmented reality eyewear device to operate augmented reality applications. Referring to FIG. 1, a user viewing the virtual image through the sensor fusion augmented reality eyewear device 100 is illustrated.

Figure 2:
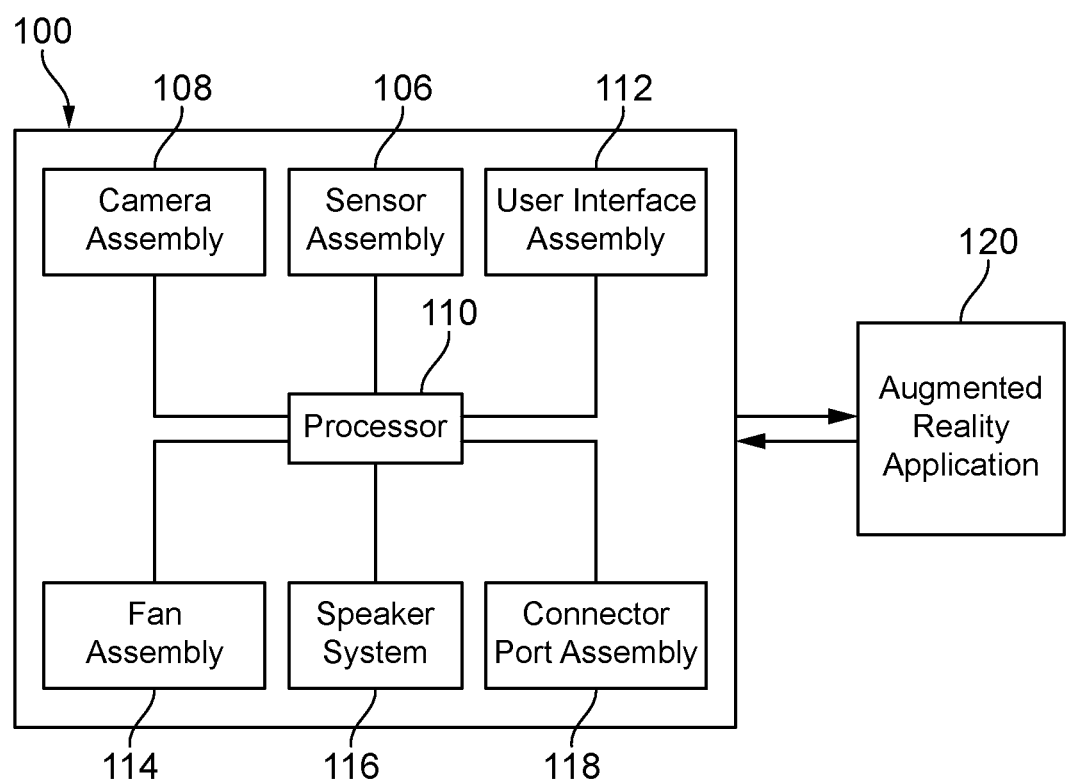
FIG. 2 exemplarily illustrates various components and their connections of the eyewear device in an embodiment of the present invention.
Figure 3:
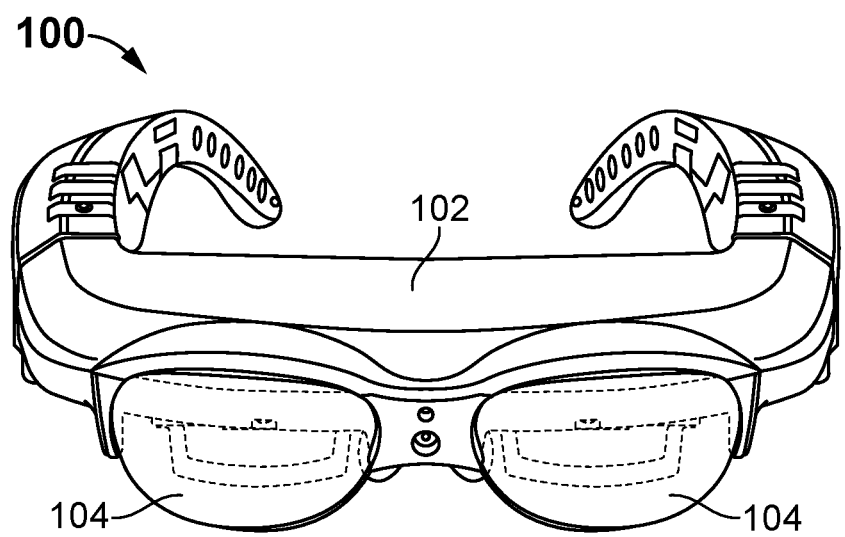
FIG. 3 exemplarily illustrates a front perspective view of the sensor fusion augmented reality eyewear device in an embodiment of the present invention.

Referring to FIG. 2 and FIG. 3, the device 100 comprises a frame 102 supporting a glasses lens/optical display 104, which is configured to be worn by the user. The frame 102 is associated with a processor 110, a sensor assembly 106 in communication with the processor 110, a camera assembly 108 in communication with the processor 110 and a user interface control assembly 112 in communication with the processor 110. The user interface control assembly 112 comprises audio command control, head motion control and wireless Bluetooth control. The optical display 104 is coupled to the processor 110 and a camera PCB board.

In one embodiment, the sensor assembly 106 comprises at least two inertial measurement unit (IMU) sensor. In one embodiment, at least one IMU is a raw IMU sensor and at least one IMU sensor is an android connected IMU. In an embodiment, a raw IMU and the android connected IMU data from the at least two inertial measurement unit are transmitted to the processor 110. In one embodiment, the processor 110 receives sensor data in a combined manner.

In one embodiment, the camera assembly 108 comprises at least two wide angle cameras synchronized with another is configured to transmit camera feed data to the processor 110. The processor 110 is configured to dually synchronize raw IMU Data and data from android connected IMU with the camera feed data providing a seamless display of 3D content of the one or more augmented reality application 120. In one embodiment, the camera feed data from the at least two wide angle cameras are combined into a single data before processing by the processor 110. The processor 110 is configured to dually synchronize raw IMU Data and android connected IMU data with the camera feed data providing a seamless display of 3D content of the augmented reality application 120.

In one embodiment, the raw IMU Data and android connected IMU data are dually synced with the camera feed data via an internal clock setup to ensure that no discrepancies are found. In one embodiment, the camera feed data from at least two wide angle cameras are combined prior to processing via an I2C electrical connection. The synchronized feed also allows for seamless display of 3D content via a DSI electrical interface input from the processor 110 to the displays 104 while integrating the camera feed. In one embodiment, the at least two IMU sensor configured to rotate to match with an axis of at least two wide angle cameras. In one embodiment, the camera assembly 108 further comprises a thermal camera coupled to a camera PCB camera board.

Further, the placement and angle of the camera assembly 108 is customizable for simultaneous localization and mapping of the environment. In some embodiments, the camera assembly 108 comprises at least three synchronized cameras to map out the environment. In one embodiment, the device 100 further comprises a Vision Eye Simultaneous localization and mapping (SLAM) software developer's kit (SDK) tool, which utilizes the cameras on the smart glasses to map out the environment in a sophisticated manner.

In one embodiment, the sensor assembly 106 comprises a light sensor coupled to the processor 110 is configured to input environmental condition, and wherein the processor 110 is configured to provide a display characteristic based on the environmental condition. In one embodiment, the display characteristic may be brightness, contrast, and the like. The surrounding environmental condition may be a level of brightness that without the display characteristic adjustment would make the displayed content difficult to visualize by the user of the device 100, where the display characteristic adjustment may be applied to an area of the optical assembly where content is being projected.

In an embodiment, the light sensor is an RGB (Red, Green and Blue) camera, which captures environmental lighting condition, for example, indirect sunlight with a high lumens light level. Then, the light sensor would reduce or dim the optical display 104 brightness. In one embodiment, the cameras, the light, the flashlight, the thermal sensor are connected to the camera PCB board.

In one embodiment, the sensor assembly 106 further comprises thermal sensor, flashlight sensor, 3-axis accelerometer, 3-axis compass, 3-axis gyroscope, magnetometer sensor and light sensor. In one embodiment, the device 100 further comprises a speaker system or speaker 116 to deliver audio data to the user and a built-in Bluetooth to deliver audio data wirelessly. The eyewear device 100 further comprises a connector port assembly 118 having a mini-jack port and a Universal Serial Bus Type-C (USB-C) port. The connector port assembly 118 allows users to insert their manual audio headphones. The USB-C port allows the user to charge the device or data-transfer purposes. In one embodiment, the frame 102 is further integrated with a wireless transceiver coupled to the processor 110. The device 100 further comprises a fan assembly 114 coupled to the processor 110, wherein the fan assembly 114 is synchronized to speed up or slow down based on the processor's heat.

In one embodiment, the user interface control assembly 112 comprises audio software developer's kit (SDK) and documentation for audio commands, head tracking SDK and documentation for head motion controls, a wireless controller for wireless bluetooth control.

In one embodiment, the processor 110 comprises an android based operating system. In another embodiment, the processor 110 is an android based snapdragon. In yet another embodiment, the device 100 comprises System on Module (SoM) processor. In yet another embodiment, the device 100 uses Adreno 530 GPU ARM based chip with 4 GB RAM and 64 GB Storage and Android 8.0 as operating system. The device design optimizes the frame rate of the processor 110 between 60 fps and 30 fps to be in synchronize with the IMUs. In an embodiment, the processor firmware is highly optimized for the device design. The camera firmware in the android build system of the processor 110 was autofocused, which required configuring specific variables to each camera's actuator information. Further, specific device drivers were built for the speaker 116 and individual sensors like the flashlight and thermal sensor. Therefore, the standard 820 processor android framework was highly customized for the device 100.

In one embodiment, the device 100 further comprises an integrated slam or SLAM (Simultaneous Localization and Mapping) system, visual odometry tracking, environment meshing, dominant plane detection and dynamic occlusion. Advantageously, the device 100 is configured to be used in both indoor and outdoor. In one embodiment, the device 100 uses I2C electrical connection to connect to different sensors. The device 100 further comprises a custom LVDS to DSI high speed connection to convert the data into a format that could be read from the 820-processing chip to the optical displays 104. A High-speed data connection were utilized between the processing chip and the 6 Degrees of Freedom IMU. The IMU is also connected to the android OS pipeline so that the IMU data can be read by the Android operating system.

Figure 4:
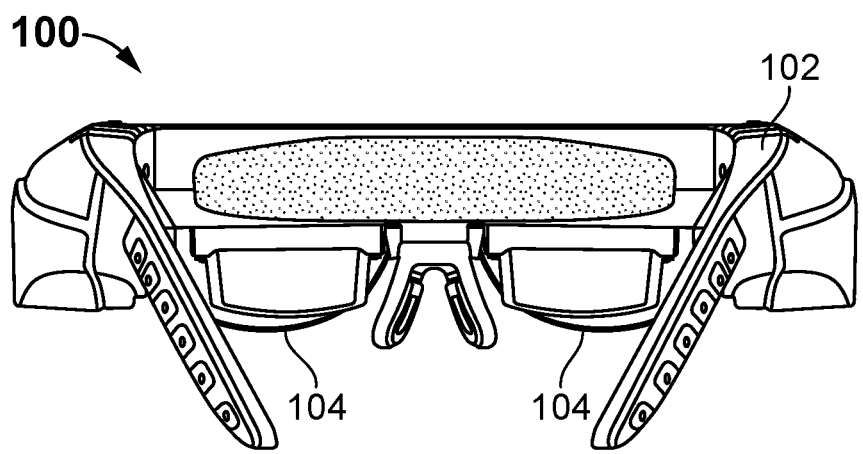
FIG. 4 exemplarily illustrates a rear perspective view of the sensor fusion augmented reality eyewear device in an embodiment of the present invention.

FIG. 4 exemplarily illustrates a rear perspective view of the sensor fusion augmented reality eyewear device 100 in an embodiment of the present invention. In one embodiment, the device 100 comprises non-replaceable battery to supply power. Further, the device 100 fits all mechanical, electrical and software into a single mechanical form factor. The optical display 104 of the device 100 is a stereoscopic see through dual display with a wide field of view of 45° diagonal. The processor 110 powers up the optical displays 104, which render content in front of the user of the smart glasses or eyewear device 100. The field of view of the smart glasses 100 is wider than existing device, is due to the nature of the optical waveguides used in the smart glasses Advantageously, the device 100 allows eye glasses wearers to attach prescriptive corrective lens via optical partner. Also, the positioning of the individual components is uniquely designed to ensure that the electrical design was optimized. The major heating component of the 820 processor was siloed from the other heating components such as speaker 116, to ensure the heat dissipation of the device 100 was optimized and that the weight was evenly distributed. In one embodiment, the materials chosen for the moulding were also optimized for heat dissipation with a metal heat sink placed at the front of the device 100.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An augmented reality eyewear device to operate augmented reality applications, comprising:
   a frame supporting an optical display configured to be worn by a user, wherein said frame is associated with:
   a processor,
   a sensor assembly coupled to the processor comprises at least two inertial measurement unit (IMU) sensor configured to transmit a raw IMU data of at least one IMU sensor and an android connected IMU data of at least one IMU sensor, wherein the at least two IMU sensor configured to rotate to match with an axis of at least two wide angle cameras wherein the sensor assembly further comprises a light sensor coupled to the processor is configured to input environmental condition, and wherein the processor is configured to provide a display characteristic based on the environmental condition, and the sensor assembly further comprises a thermal sensor, a flashlight sensor, a 3-axis accelerometer, a 3-axis compass, a 3-axis gyroscope, a magnetometer sensor and a light sensor, a camera assembly coupled to the processor comprises at least two wide angle cameras synchronized with one another configured to transmit camera feed data from the camera assembly to the processor, wherein the camera feed data from at least two wide angle cameras are combined prior to processing via an I2C electrical connection, wherein a placement and angle of the camera assembly is customizable for simultaneous localization and mapping of the environment, and a user interface control assembly coupled to the processor, wherein the processor is configured to dually synchronize raw Mai data and android connected IMU data with the camera feed data providing a seamless display of three-dimensional (3D) content of the augmented reality applications, and further comprises visual odometry tracking, environment meshing, dominant plane detection and dynamic occlusion.

2. The eyewear device of claim 1, wherein the frame is further integrated with a wireless transceiver coupled to the processor.

3. The eyewear device of claim 1, further comprises a fan assembly coupled to the processor, wherein the fan assembly is synchronized to speed up or slow down based on the processor's heat.

4. The eyewear device of claim 1, further comprises a light assembly coupled to the processor.

5. The eyewear device of claim 1, further comprises a connector port assembly having a mini-jack port and a Universal Serial Bus Type-C (USB-C) port.

6. The eyewear device of claim 1, wherein the processor comprises an android based operating system.

7. The eyewear device of claim 1, wherein the processor is an android based snapdragon processor.

8. The eyewear device of claim 1, further comprises a speaker system to deliver audio data to the user and a built-in Bluetooth to deliver audio data wirelessly.

9. The eyewear device of claim 1, further comprises a thermal camera coupled to a camera PCB board in communication with the processor.

10. The eyewear device of claim 1, wherein the user interface control comprises audio command control, head motion control and wireless Bluetooth control.

11. The eyewear device of claim 1, further comprises an integrated SLAM (Simultaneous Localization and Mapping) system.

12. The eyewear device of claim 1, is configured to use in both outdoor and indoor.

* * * * *